Figure 1:
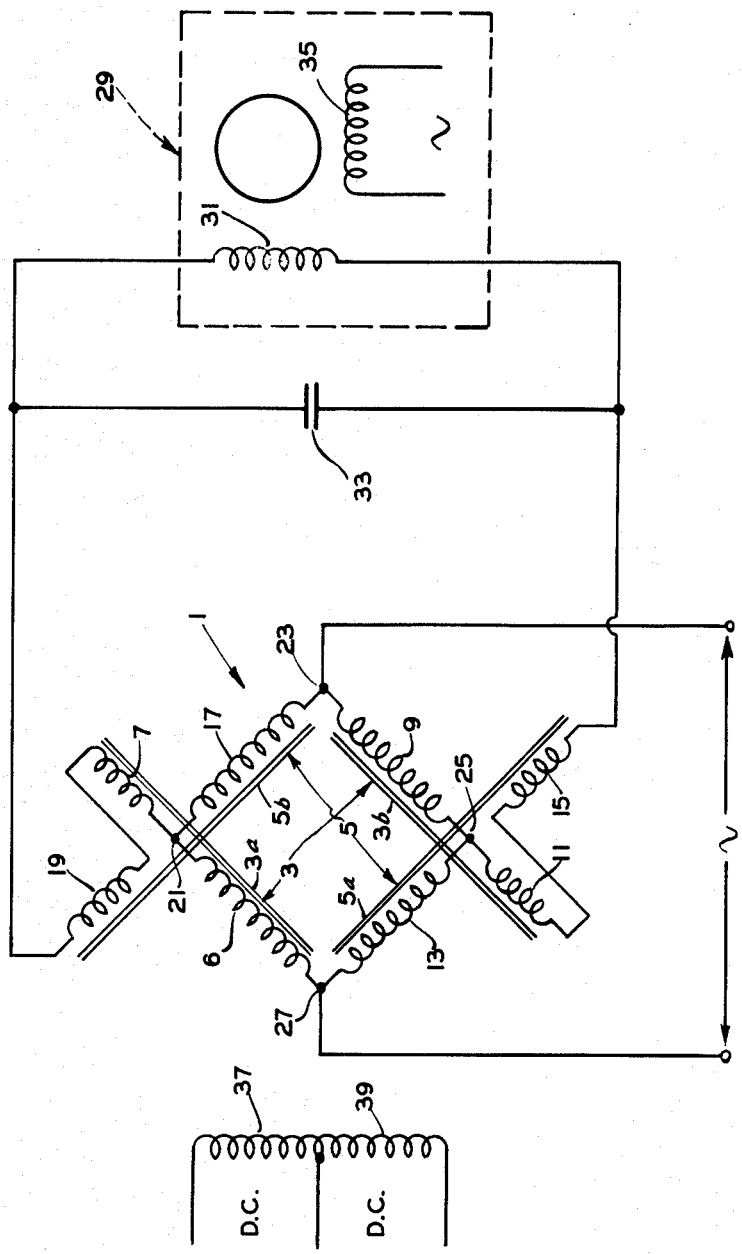

INVENTORS
STEPHEN J. POLCYN, JR.
ARNOLD UNGER
BY
ATTORNEY

United States Patent Office 3,204,166
Patented Aug. 31, 1965

3,204,166
SATURABLE REACTOR MOTOR CONTROL
CIRCUIT
Stephen J. Polcyn, Jr., Hasbrouck Heights, and Arnold Unger, Totowa, N.J., assignors to The Bendix Corporation, Teterboro, N.J., a corporation of Delaware
Filed Nov. 3, 1961, Ser. No. 149,968
18 Claims. (Cl. 318—207)

This invention relates to control circuits and more particularly to control circuits which may be used for operating servo motors.

Heretofore, it has been necessary to use a power transformer in a servo motor control circuit in order to step up the voltage energizing the motor. This is disadvantageous where size and weight must be a minimum. Furthermore, use of a power transformer in a control circuit reduces the overall efficiency of the system and generates heat which must be dissipated.

One object of this invention is to eliminate the need for a power transformer in a servo motor control circuit.

Another object of this invention is to provide a servo motor control circuit which requires minimum heat dissmall in size and rugged in construction.

Another object of this invention is to provide a servo motorb control circuit which requires minimum heat dissipation.

Another object of this invention is to enable a plurality of servo motors to be driven directly from line to neutral voltages and without the need of any transformers in the motor circuit.

The invention contemplates a control circuit comprising a saturable reactor having gate windings and booster windings and with a booster winding inductively coupled to a gate winding, a bridge circuit having a gate winding in each arm adapted to be energized by a power source, a load connected to the bridge circuit in series with the booster windings, and means for changing reactance of the gate windings to unbalance the bridge circuit.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing FIGURE 1 shows a schematic diagram of a control circuit constructed according to the invention for controlling a two-phase motor.

Figure 2:
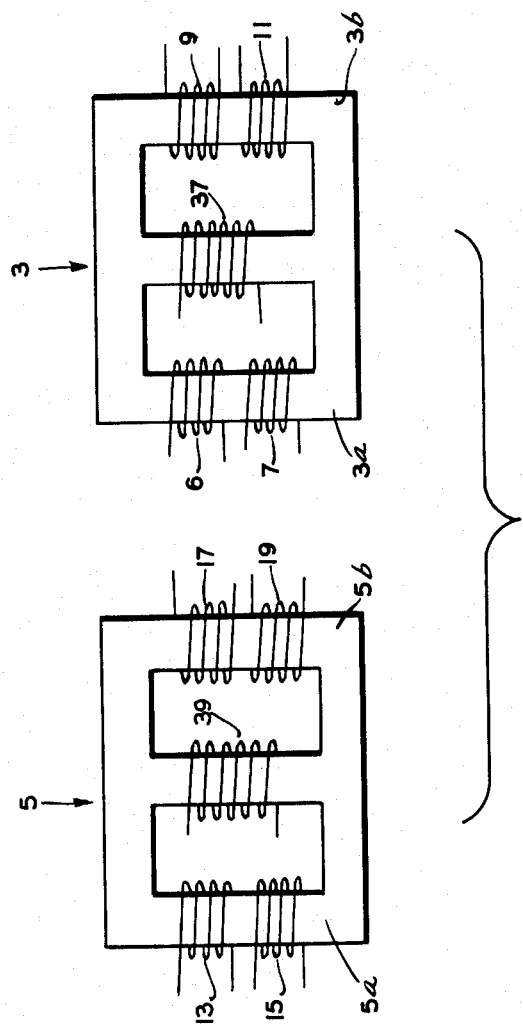

FIGURE 2 shows diagrammatically the saturable reactor shown in FIGURE 1.

The novel control circuit shown in the drawing comprises a saturable reactor 1 having a pair of cores 3 and 5. Core 3 has a leg 3a with a gate winding 6 and booster winding 7 thereon and a leg 3b with a gate winding 9 and a booster winding 11 thereon. Core 5 has a leg 5a with a gate winding 13 and a booster winding 15 thereon and a leg 5b with a gate winding 17 and a booster winding 19 thereon. The windings on the same core are inductively coupled, for example, windings 6 and 7 on leg 3a and windings 9 and 11 on leg 3b are inductively coupled and windings 13 and 15 on leg 5a and windings 17 and 19 on leg 5b are inductively coupled.

Gate windings 6, 9, 13 and 17 are connected in the four arms of a bridge circuit with windings 6 and 17 connected at terminal 21, windings 9 and 17 connected at terminal 23, windings 9 and 13 connected at terminal 25, and windings 6 and 13 connected at terminal 27.

An alternating power supply is connected across opposing terminals 23 and 27 of the bridge circuit, and a load, such as a two-phase motor 29, has its variable phase winding 31 connected in series with booster windings 11, 15, 19 and 7 to opposing terminals 21 and 25. A capacitor 33 is connected across variable phase winding 31 of motor 29. Fixed phase winding 35 of motor 29 may be connected to the alternating power source.

Capacitor 33 provides sufficient reaction in the circuit to phase shift the currents energizing variable phase winding 31 and fixed phase winding 35 through 90°. When a three-phase system is used as a source of excitation, then the phase shift can be adjusted to 30° lag to give the 90° displacement between the fixed and variable phases of the motor when the variable phase is excited through the reactor from the reference line to neutral voltage and the fixed phase is excited from the next phase 120° lagging the reference phase.

Control windings 37 and 39 are wound on cores 3 and 5, respectively, for applying unidirectional flux to the associated core when energized by direct currents. Energization of control windings 37 and 39 magnetizes or saturates the associated core and controls operation of motor 29.

When control windings 37 and 39 are energized by equal quiescent values of direct current signal to magnetize cores 3 and 5 equally with unidirectional flux at less than saturation value, the impedances of gate windings 6, 9, 13 and 17 are equal and no voltage appears across terminals 21 and 25. The voltages induced by booster windings 7 and 19 and in booster windings 11 and 15 are equal and of opposite polarity, and thus cancel each other. The net result is that under these conditions of equal control winding excitation, variable phase 31 of motor 29 is de-energized.

When the direct current signal applied to control winding 39 is increased and the direct current signal applied to control winding 37 is decreased so that the signal applied to control winding 39 is greater than the signal applied to control winding 37, the magnetization of core 5 is increased and the magnetization of core 3 is decreased so that core 5 is magnetized more than core 3. This causes a decrease in the reactance of gate windings 13 and 17 on core 5 and an increase in the reactance of gate windings 6 and 9 on core 3. The voltage across gate windings 13 and 17, therefore, is less than the voltage across gate windings 6 and 9 so that the bridge is unbalanced and a voltage appears across terminals 21 and 25 to operate motor 29 in one direction.

Voltages are induced across booster windings 7 and 11 in a direction to aid the voltages across gate windings 6 and 9 and the voltages induced in booster windings 7 and 11 on core 3 are greater than the voltages induced in booster windings 15 and 19 on core 5. Thus, the voltage across variable phase 12 of motor 3 may be effectively increased beyond the amplitude of the source voltage and the increase in voltage may be any desired amplitude by selecting the turn ratio of the windings 6 and 7 and windings 9 and 11. If desired, the amplitude of the voltage applied across the variable phase 12 of motor 13 may be made less than the source voltage across terminals 23 and 27 by reversing the connections to booster windings 7 and 11 so windings 7 and 11 oppose windings 6 and 9, respectively, and by selecting a suitable turn ratio between windings 6 and 7 and windings 9 and 11, respectively. The turn ratio and connections of booster windings 15 and 19 relative to gate windings 13 and 17 should be the same as the turn ratio and connections of windings 9 and 11 relative to gate windings 6 and 9.

When the direct current signal applied to control winding 39 is decreased and the direct current signal applied to control winding 37 is increased so that the signal applied to control winding 39 is less than the signal applied to control winding 37, then a voltage of opposite phase appears across terminals 21 and 25 to rotate motor 29 in the opposite direction.

The control circuit herein is especially adapted for driving a two-phase servo motor and is relatively light in weight, small in size, and rugged in construction. There is no need for a power transformer in the control circuit and the power output is such that a plurality of servo motors may be driven directly by the line to neutral voltages without the need of any transformers in the load circuit. Also, heat dissipation requirements are reduced to a minimum.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control circuit comprising a saturable reactor having a pair of cores with gate windings and booster windings on each core and means for magnetizing the cores, a bridge circuit having one of said gate windings in each arm and adapted to be energized by a power source, and a load connected to the bridge circuit and in series with the booster windings.

2. A control circuit comprising a saturable reactor having a pair of cores with gate windings and booster windings on each core, a bridge circuit including the gate windings and adapted to be energized by a power source, a load connected to the bridge circuit and in series with the booster windings, and means for magnetizing the cores to unbalance the bridge circuit.

3. A control circuit comprising a saturable reactor having gate windings and booster windings and with a booster winding inductively coupled to a gate winding, a bridge circuit including the gate windings and adapted to be energized by a power source, a load connected to the bridge circuit and to the booster windings, and means for changing reactance of the gate windings to unbalance the bridge circuit and booster windings to energize the load.

4. A control circuit comprising a saturable reactor having gate windings and booster windings and with a booster winding inductively coupled to a gate winding, a bridge circuit having one of said gate windings in each arm and adapted to be energized by a power source, a load connected to the bridge circuit in series with the booster windings, and means for changing reactance of the gate windings to unbalance the bridge circuit to energize the load.

5. A control circuit comprising a saturable reactor having a pair of cores with gate windings and booster windings on each core and with a booster winding inductively coupled to a gate winding, a bridge circuit including the gate windings and adapted to be energized by a power source, a load connected to the bridge circuit and to the booster windings, and means for magnetizing the cores to unbalance the bridge circuit.

6. A control circuit comprising a saturable reactor having gate windings and booster windings and with a booster winding inductively coupled to a gate winding, a bridge circuit having one of said gate windings in each arm and adapted to be energized by a power source, a load connected to the bridge circuit in series with the booster windings, and means for changing reactance of the gate windings in opposing arms of the bridge circuit to unbalance the bridge circuit to energize the load.

7. A control circuit comprising a saturable reactor having gate windings and booster windings and with a booster winding inductively coupled to a gate winding and connected in aiding relationship, a bridge circuit including the gate windings and adapted to be energized by a power source, a load connected to the bridge circuit in series with the booster windings, and means for changing reactance of the gate windings to unbalance the bridge circuit to energize the load.

8. A control circuit comprising a saturable reactor having gate windings and booster windings and with a booster winding inductively coupled to an associated gate winding and connected in aiding relationship thereto, a bridge circuit having one of said gate windings in each arm and adapted to be energized by a power source, a load connected to the bridge circuit in series with the booster windings, and means for changing reactance of the gate windings in opposing arms of the bridge circuit to unbalance the bridge circuit to energize the load.

9. A control circuit comprising a saturable reactor having gate windings and booster windings and with a booster winding inductively coupled to an associated gate winding and connected in aiding relationship thereto, a bridge circuit having one of said gate windings in each arm and adapted to be energized by a power source, a load connected to the bridge circuit in series with the booster windings, and means for changing reactance of the gate windings in opposing arms of the bridge circuit to unbalance the bridge circuit and for changing the reactance of the associated booster windings to energize the load.

10. A control circuit comprising a saturable reactor having a pair of cores with two gate windings and two booster windings on each core, a bridge circuit having four arms with a terminal between each pair of arms and with one of said gate windings in each arm and with the gate windings on the same core in opposing arms, a power source connected to two opposing terminals of the bridge circuit, and a load connected in series with the booster windings to the other two opposing terminals of the bridge circuit, and means for magnetizing the cores unequally to unbalance the bridge circuit.

11. A control circuit comprising a saturable reactor having a pair of cores with gate windings and booster windings on each core and with each booster winding inductively coupled to a gate winding and connected in aiding relationship thereto, a bridge circuit having four arms with a terminal between each pair of arms and with one of the gate windings in each arm and with the gate windings on the same core in opposing arms, a power source connected to two opposing terminals of the bridge circuit, and a load connected in series with the booster windings to the other two opposing terminals of the bridge circuit, and means for magnetizing the cores unequally to unbalance the bridge circuit.

12. A control circuit comprising a saturable reactor having a pair of cores with gate windings and booster windings on each core and with each booster winding inductively coupled to a gate winding, a bridge circuit having one of said gate windings in each arm and adapted to be energized by a power source, a load connected to the bridge circuit in series with the booster windings, and means for magnetizing the cores to unbalance the bridge circuit.

13. A control circuit comprising a saturable reactor having a pair of cores with gate windings and booster windings on each core and with the booster windings inductively coupled to the gate windings, a bridge circuit including the gate windings and adapted to be energized by a power source, a two-phase motor having its fixed phase adapted to be energized by the power source and having its variable phase connected to the bridge circuit in series with the booster windings, and means for magnetizing the cores to unbalance the bridge circuit to operate the motor.

14. A saturable reactor having a pair of cores with gate windings and booster windings on each core, a bridge circuit including the gate windings and having an input adapted to be energized by a power source and an output connected to the booster windings and adapted to energize a load.

15. A saturable reactor having a pair of cores with gate windings and booster windings on each core, a bridge circuit having a gate winding in each arm and having an input adapted to be energized by a power source and an output connected to the booster windings and adapted to energize a load.

16. A control circuit comprising a saturable reactor having a pair of cores with gate windings and booster windings on each core and with each booster winding inductively coupled to a gate winding, a bridge circuit including the gate windings and having an input adapted to be energized by a power source and an output connected to the booster windings and adapted to energize a load.

17. A control circuit comprising a saturable reactor having a pair of cores with gate windings and booster windings on each core and with each booster winding inductively coupled to a gate winding, a bridge circuit having a gate winding in each arm and having an input adapted to be energized by a power source and an output connected to the booster windings and adapted to energize a load.

18. A saturable reactor having a pair of cores with gate windings and booster windings on each core and with each booster winding inductively coupled to a gate winding and connected in aiding relationship thereto, a bridge circuit having one of said gate windings in each arm and having an input adapted to be energized by a power source and an output connected to the booster windings and adapted to energize a load.

References Cited by the Examiner

UNITED STATES PATENTS

| | | | |
|---|---|---|---|
| 2,432,399 | 12/47 | Edwards | 323—89 X |
| 2,811,683 | 10/57 | Spencer | 318—207.55 |

ORIS L. RADER, *Primary Examiner.*

MILTON O. HIRSHFIELD, *Examiner.*